UNITED STATES PATENT OFFICE.

EDWARD WATSON, OF GRAND RAPIDS, MICHIGAN.

MATERIAL FOR WALL-COATING AND METHOD OF MAKING SAME.

SPECIFICATION forming part of Letters Patent No. 522,637, dated July 10, 1894.

Application filed February 12, 1894. Serial No. 499,968. (No specimens.)

*To all whom it may concern:*

Be it known that I, EDWARD WATSON, a citizen of the United States, residing at Grand Rapids, in the county of Kent and State of Michigan, have invented certain new and useful Improvements in Material for Wall-Coating and Methods of Making the Same, of which the following is a specification.

My invention relates to that class of adhesive compounds for wall coating, containing calcined gypsum as the principal pigment or body, and an adhesive agent. Such compounds are prepared in a dry powder, ready for use by mixing with water. To these compounds any coloring matter or paints may be added, and by some manufacturers various metallic salts may be added to the compound. The adhesive agent generally entering into these compounds is glue, which is incorporated with the calcined gypsum either in the dry form and then reground, or the liquid glue is first mixed with calcined gypsum and then dried and ground. All compounds for this purpose, which contain glue in its pure form, are subject to certain disadvantages pertaining to the nature of glue.

The object of my invention is to make an improved adhesive compound, free from many of the objections pertaining to such products generally offered to the public.

By my process I produce an adhesive wall coating compound which may be used by simply mixing with water; which does not change its condition after being mixed with water, and holds up the pigments without settling; has good body or covering power; is easy of application to the wall, and when dry does not crack or scale off.

The process by which I make my improved adhesive wall coating compound is about as follows: Starting out with glue, I may take dry glue, or its equivalent quantity of liquid glue as made by the glue maker before drying. Estimating the glue as dry, I take of dry animal glue one hundred pounds, then add to it twenty five gallons of water, let the mixture rest a few minutes, then add to it five pounds of lime (recently burned, or slaked), then boil the mixture half an hour with occasional stirring, and then add to it twenty five pounds of water-glass sirup, (either that made by potash or soda,) and continue to stir the mixture for a few minutes longer, then add to the mixture twenty pounds of sulphate of magnesia, and occasionally stir the mixture for several minutes longer without boiling, then thoroughly incorporate with the adhesive mixture one thousand pounds of calcined gypsum, then expel the water by heat, and subsequently reduce the product to a very fine powder, which constitutes my improved adhesive wall coating compound, which may be used at any subsequent time by simply mixing with water.

The above described proportions and exact steps taken may be changed or modified without departing from the spirit of my invention or impairing the usefulness of the product.

It may be stated that in this process the properties of the glue have been changed and a new chemical substance produced, which is wanting in the essential property of glue, which is: that the liquid does not when cold become gelatinous.

It will be observed that the adhesive mixture as above described, contains when ready to incorporate with the calcined gypsum; the changed glue, sulphate of soda or potash, silicate of lime and magnesia, magnesia hydrate, and silica hydrate. All of which play a very important part, not only in the process of incorporating the adhesive mixture with the calcined gypsum, but especially in the practical working of the adhesive compound when mixed with water for use, and in its power to ultimately set as a true cement on the wall, and contribute to its hardness and beauty of finish.

The essential element in my invention does not rest in the mere matter of boiling glue with water and an alkali, which is not new, but my invention rests upon the inherent properties of the adhesive matter when treated in practically the manner set forth, and especially upon the entire combination of ingredients contained in the finished product.

In manufacturing material by my process in case it may be desirable to add to the compound any coloring matter or paints, or certain metallic salts, such additions may be made at any stage of the process, or be added to the finished product.

As to the manner of incorporating the adhesive mixture with the calcined gypsum, it may be effected in any manner or by any means which may be best suited to the manufactures, and may be in an open receptacle or closed until the mixture is heated to about 212° Fahrenheit, when the water should be allowed to evaporate, and during the process of mixing or drying, the mixture should be occasionally or constantly stirred.

The calcined gypsum may be cold when mixed with the adhesive mixture, and heat applied to expel water, or the calcined gypsum may be first heated for the purpose, or advantage taken of the heat contained in the calcined gypsum at the completion of the calcining process, and by regulating the heat the adhesive mixture may be introduced directly into the calcining kettle at the termination of the calcining process and then stirred until dry.

In drying this compound the heat should generally be kept near 212° Fahrenheit, but with caution it may be somewhat increased to hasten the expulsion of the water.

I claim—

The process of manufacturing a wall coating compound, which consists of the following steps: first, adding water to animal glue, then adding lime, then boiling the mixture, adding to it water-glass sirup, then adding sulphate of magnesia, then incorporating the adhesive mixture with calcined gypsum, then drying the compound, and subsequently reducing the product to a very fine powder, substantially as described.

EDWARD WATSON.

Witnesses:
JAS. B. RUSSELL,
ALICE J. FRALICK.